United States Patent [19]
Myneni

[11] Patent Number: 5,932,797
[45] Date of Patent: *Aug. 3, 1999

[54] SENSITIVE HYDROGEN LEAK DETECTOR

[75] Inventor: Ganapati Rao Myneni, Yorktown, Va.

[73] Assignee: Southeastern Universities Research Assn., Newport News, Va.

[*] Notice: This patent is subject to a terminal disclaimer.

[21] Appl. No.: 08/934,878

[22] Filed: Sep. 22, 1997

Related U.S. Application Data

[63] Continuation-in-part of application No. 08/646,773, May 8, 1996, Pat. No. 5,703,281.

[51] Int. Cl.[6] .................................................... G01M 3/20
[52] U.S. Cl. ............................................................. 73/40.7
[58] Field of Search ................................................. 73/40.7

[56] References Cited

U.S. PATENT DOCUMENTS

| 4,163,828 | 8/1979 | Mahoney | 428/411 |
| 5,703,281 | 12/1997 | Myneni | 73/40.7 |
| 5,827,949 | 10/1998 | Ohmi et al. | 73/40 |

*Primary Examiner*—Michael Brock

[57] ABSTRACT

A sensitive hydrogen leak detector system using passivation of a stainless steel vacuum chamber for low hydrogen outgassing, a high compression ratio vacuum system, a getter operating at 77.5 K and a residual gas analyzer as a quantitative hydrogen sensor.

6 Claims, 1 Drawing Sheet

SENSITIVE HYDROGEN LEAK DETECTOR

This application is a continuation-in-part of U.S. patent application Ser. No. 08/646,773 filed May 8, 1996, now U.S. Pat. No. 5,703,281, all of which application is incorporated herein by reference.

The United States may have certain rights to this invention under Management and Operating Contract DE-AC05-84ER40150 from the United States Department of Energy.

FIELD OF THE INVENTION

This invention relates to a sensitive hydrogen leak detector.

BACKGROUND OF THE INVENTION

There has been an increased need for a sensitive hydrogen leak detector in view of the expected expanding needs generated for the use of hydrogen fuel technology in numerous applications such as the contemplated national space plane.

SUMMARY OF THE INVENTION

The present invention is a sensitive hydrogen leak detector which utilizes passivation of a stainless steel vacuum chamber for low hydrogen outgassing, a high compression ratio vacuum system, and a dry nitrogen pump at the exhaust stage plus a low cost residual gas analyzer as a quantitative hydrogen sensor. Also a getter operating at 77.5 K for effective pumping of hydrogen may be utilized.

The objects and advantages of the preferred embodiment will become apparent when reading the attached description of the invention and with reference to the drawing.

DESCRIPTION OF THE INVENTION

Figure 1:
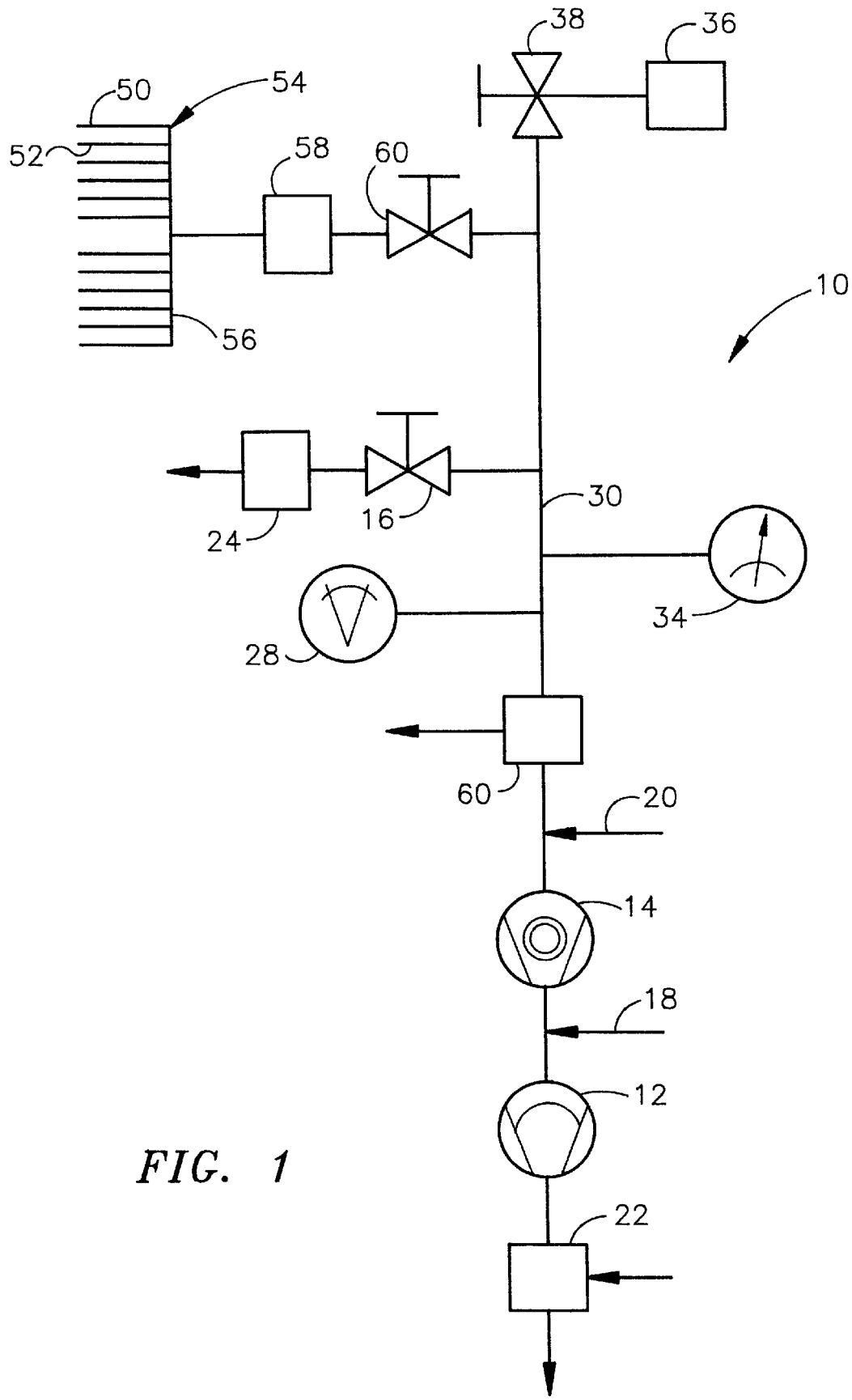
FIG. 1 is a schematic view of a preferred embodiment of this invention for a sensitive leak detector system.

The preferred embodiment of the invention comprises a hydrogen leak detector which is depicted in the schematic view shown in FIG. 1. The hydrogen leak detector 10 includes a backing pump 12 which provides rough pumping of the system and a turbo pump 14. The area to be monitored or checked for hydrogen leaks is optionally shown as either the monitoring system 54 or a single tube monitor 24.

The backing pump 12 is a first stage pump and the turbo pump 14 is a second stage pump. A dry nitrogen feed 18 is provided at the entrance to the backing pump 12. Another dry nitrogen feed 20 is provided at the entrance of the turbo pump 14. These feeds, 18 and 20, feed pure and dry nitrogen at a flow rate which is sufficient to prevent backstreaming but not an amount to provide a pressure greater than the residual gas analyzer (RGA) 28 will properly function at.

An exhaust aspirator 22 is connected at the exhaust of the backing pump 12 and is provided with a source of dry nitrogen at the exhaust.

The hydrogen leak detector system of the monitoring system 54 can be connected to a specific area to be monitored through a manifold 56 so that individual lines as exemplified by monitor line 50 and monitor line 52 are connected to different areas. When an area is being monitored by the manifold 56 a valving system (not shown) may be connected by a valve sequencer 58 so that only a single monitor line is connected to the manifold for monitoring at a single time. The monitor is connected to common manifold 30 by valve 60.

Optionally, rather than a monitor system 54, a single tube monitor 24 may be used. The monitor 24 is connected to common manifold 30 through valve 16.

A residual gas analyzer (RGA) 28 is provided in close proximity to the common manifold 30. A pumping system isolation valve 38 is provided in the common manifold 30 to a source of dry nitrogen purge gas 36.

A vacuum gauge 34 is connected to the common manifold 30.

A sensitive hydrogen leak detector system is operated in the following manner to provide improved sensitive hydrogen detection:

1. close the evacuator isolation valve 16 and the purge nitrogen valve 38;
2. start the exhaust aspirator 22 using dry nitrogen, the backing pump 12, and the turbo pump 14, and insure that dry nitrogen flow is available to the purge nitrogen line 36, the nitrogen feed 18 to the backing pump 12, and the nitrogen feed 20 to the turbo pump 14;
3. provide an area to be tested for hydrogen leaks and connect it to the leak detector system with the valves to the area closed;
4. pump the common manifold 30 down to 20 torr;
5. when the vacuum gauge 34 reads 10 to the minus 6 torr, turn the RGA (residual gas analyzer) 28 on;
6. open the valve to the area to be tested for hydrogen leaks.
7. read the output of the RGA 28.

The sniffer probes for the hydrogen will be continuously purged with dry nitrogen until a sampling is needed for a hydrogen leak check.

The backing pump 12 is typically a Varian diaphragm pump, Model MDP12, which is considered the rough or first stage pump and is capable of pumping the system down to 10 to the minus one or two torr. Although the Varian diaphragm pump is preferred in this application, the backing pump could also be a rotary pump, a scroll pump, or a cryogenic pump or any pump that is capable of similar pumping capability.

The turbo pump 14 is typically a Varian turbo pump, Model V70LP, which is considered the second stage pump and is capable of pumping the system down to 10 to the minus six torr. Although the Varian turbo pump is preferred, the second stage pump could also be a diffusion pump or a cryogenic pump or any pump that is capable of similar pumping capability. The pumps can be combined into a single two stage pump.

The backing pump 12 and turbo pump 14 work in conjunction to achieve a desired pressure of 10 to the minus six torr in the common manifold 30 for the hydrogen leak test. A first main pumping is done by the backing pump 12. The main pumping is then done by the turbo pump 14 until the pressure at its inlet and in the common manifold 30 is 10 to the minus six torr. All the time that the pumps are pumping the system pressure down, the backing pump dry nitrogen feed 18 is feeding the inlet of the backing pump 12 at a rate of 1×10 to the minus one atm cc s to the minus one and keeping hydrogen from backstreaming through the backing pump. As the pumps are operating, the turbo pump dry nitrogen feed 20 is also feeding the inlet of the turbo pump 14 and keeping hydrogen from backstreaming through the turbo pump 14 and the backing pump nitrogen feed 18 in keeping hydrogen from backstreaming through the backing pump 12.

The vacuum gauge 34 is capable of reading from ambient pressure (760 torr) to 10 to the minus five torr and is readily available. The vacuum gauge 34 can be connected through a programmable logic controller (not shown) to the valves in the system to automatically open and close the valves in the proper sequence to automate the entire leak detection cycle, although the test vessel is still connected to the system manually.

The RGA 28 is typically a RGA Residual Gas Analyzer available from the Stanford Research Systems, Inc., 1290-D Reamwood Avenue, Sunnyvale, Calif. 94089. A mass spectrometer could also be used in place of the RGA 28.

The exhaust aspirator pump 22 is typically a MDC-Venturi vacuum pump, Model SUU-33.

None of the pumps in the system, the backing pump 12, the turbo pump 14 and the exhaust aspirator 22 depend on o-rings or oil to achieve their pumping task. Therefore outgassing of hydrogen from o-rings or oils, which would reduce the sensitivity of the hydrogen leak detector, is eliminated from the pumping system.

Hydrogen is the determining factor in getting the pressure very low. Although a system is first baked to remove as much hydrogen as possible from the walls of a system, hydrogen still continuously desorbs from the walls of the vacuum chambers. As a result of the backstreaming of the hydrogen, the hydrogen cannot be desorbed from the walls completely and therefore, it limits the pressure that can be achieved with the pumping system. By adding the exhaust aspirator 22 with its dry nitrogen feed and operating it during the bake out and afterwards, hydrogen is prevented from backstreaming from the ambient air and at the same time is eliminated from the system. The exhaust aspirator 22 therefore serves two purposes, the initial crude pump down and the subsequent prevention of the backstreaming. The ultimate pressure and consequently the outgassing of an ultra high vacuum (UHV) system can be drastically improved by connecting the exhaust aspirator 22 pump at the exhaust stage of the backing pump 12 of the system.

The critical aspect of a sensitive hydrogen detector is that normally stainless steel is used with the problem of outgassing of hydrogen which drastically lowers the sensitivity of such an arrangement. In the present case, stainless steel is the metal of choice but it is passivated to eliminate, or substantially eliminate, the outgassing of hydrogen. The passivation preference is the use of parylene of approximately 10 microns in thickness. The parylene coating deposited from the vapor phase by a process which in some respects resembles vacuum metallization. Unlike vacuum metallizing, however, which is conducted at pressures of ten to the minus three torr or below, parylene coatings are formed at around 0.1 torr. Under these conditions the mean free path that gas molecules in the deposition chamber is in the order of 0.1 centimeters. Therefore, unlike vacuum metallizing, the deposition is not line of sight, and all sides of the stainless steel vacuum chamber to be encapsulated are uniformly impinged by the gaseous monomer. This is responsible for the true conformal nature of coating.

The surface passivation is available from a number of sources including Specialty Coating Systems, Inc., 5707 W. Minnesota Street, Indianapolis, Ind. 46241.

Still further, to cut down on the residual hydrogen, a hydrogen getter pump 24 with valve 16 is used at 77.5 K utilizing a hydrogen getter such as the SORB-AC (a registered trademark) getter available from SAES Getters, S.p.A. Via Gallarate 215; 20151 Milano, Italy. The hydrogen getter is a material that absorbs the hydrogen from the system. While a getter pump 24 is preferably usable with the passivated stainless steel, a sensitive hydrogen leak detector system may rely on not using such getters.

Although there has been shown and described an example of what is at present considered the preferred embodiment of the present invention, it will be obvious to those skilled in the art that various changes and modifications may be made therein without departing from the scope of the invention as defined by the appended claims.

What is claimed is:

1. A sensitive hydrogen detector comprising:

an inlet for gas to be measured;

a vacuum system for the gas to be measured and made principally of stainless steel;

a passivation coating for said stainless steel;

a vacuum pump having an exhaust for said vacuum system;

a quantitative hydrogen sensor connected to said vacuum system; and a dry nitrogen inlet at said exhaust of said vacuum pump.

2. The sensitive hydrogen detector of claim 1 which further includes a getter pump operating at cryogenic temperatures.

3. The sensitive hydrogen detector of claim 1 wherein said passivation coating is parylene.

4. The sensitive hydrogen detector of claim 1 wherein said inlet for gas to be measured includes a multiplicity of hydrogen probes each having a valve for monitoring of different areas.

5. The sensitive hydrogen detector of claim 1 wherein said hydrogen sensor is a residual gas analyzer.

6. An apparatus for achieving sensitive leak detection comprising:

a pumping system including a backing pump, a finishing pump, an exhaust aspirator pump, a dry nitrogen feed to the inlet of said backing pump, a dry nitrogen feed to the inlet of said finishing pump, a vacuum gauge, a common manifold, a purge nitrogen flow source, a residual gas analyzer, a purge nitrogen valve between said purge nitrogen flow source and said common manifold, and a pumping system isolation valve between said common manifold and a probe for an area to be tested for hydrogen leaks.

* * * * *